INVENTOR
HEINZ KEINER
BY Krafft + Wells

United States Patent Office 3,701,594
Patented Oct. 31, 1972

3,701,594
AUTOMATIC LAP DISSOLVE FOR MOTION PICTURE CAMERAS
Heinz Keiner, Oberndorf, Germany, assignor to Ernst Leitz G.m.b.H., Wetzlar, Germany
Filed Nov. 2, 1970, Ser. No. 85,950
Claims priority, application Germany, Aug. 17, 1970, P 20 40 727.6
Int. Cl. G03b 21/36
U.S. Cl. 352—91                      2 Claims

ABSTRACT OF THE DISCLOSURE

Automatic lap dissolve mechanisms are provided in motion picture cameras having an electronic film drive, a diaphragm with leaves positioned in the light path of the camera, current controlled diaphragm control means coupled to the diaphragm and photo resistor means positioned in the light path from an object to be photographed and connected to the diaphragm control means for varying the magnitude of current in the diaphragm control means and thereby varying the opening of the diaphragm in accordance with the intensity of light in the light path from the object to be photographed. The automatic lap dissolve mechanism includes:
 (a) two electrical contacts actuated by the diaphragm leaves moving into their closed position to effect a reversal of the polarity of the camera motor;
 (b) switching means arranged in the circuit of the camera motor; and
 (c) a timer which is actuated at the beginning of the camera motor reversal of polarity and operates the switching means after a predetermined period of time has elapsed to interrupt the current flow to the camera motor.

CROSS REFERENCE TO A RELATED APPLICATION

Applicant incorporates herein the application of Heinz Keiner et al. entitled "Automatic Lap Dissolve for Motion Picture Cameras" and filed in the U.S. Patent Office on the same day as the present application. The application of Heinz Keiner et al. discloses the basic concept of the improved automatic lap dissolve camera.

BACKGROUND OF THE INVENTION

The field of the invention is motion picture optics with transition special effects, such as wipes and dissolves.

This invention relates to a lap dissolve mechanism for motion picture cameras having an electric motor film drive and an exposure control device wherein the diaphragm leaves are brought into a closed position to produce a fade-out special effect.

Motion picture cameras of the above-described type are conventional. They have an exposure control device, for example, in the form of a Wheatstone bridge, which device controls either the objective diaphragm or also the sector shutter to correspond with the respectively ambient brightness of the object. According to this prior art as disclosed in U.S. Pat. 3,419,325, it is known to provide an electric switch, by means of which the aperture control motor (in the case where the diaphragm is controlled by a motor) or the measuring mechanism (in the case where the diaphragm blades are actuated directly by the measuring mechanism) which is connected directly to the current source, circumventing the control circuit. Consequently, the diaphragm is gradually closed completely, i.e., a fade-out is effected.

The fade-out process and, conversely, also the fade-in procedure are conventionally employed at the end of a scene and the beginning of a scene for cinematic effect. However, it is also conventional to carry out lap dissolves by this method wherein the end of one scene progresses, so to speak, into the beginning of the next scene. The individual process steps to be conducted in this connection are: fade-out until the diaphragm is completely closed; reversal of the operating direction of the camera motor and backwind of the film up to the point at which the fade-out was started; and renewed advancement of the film, with the diaphragm being gradually opened.

SUMMARY OF THE INVENTION

Having in mind the limitations of the prior art, it is an object of the present invention to provide a device wherein the operation of the camera is facilitated by on the one hand, coupling the fade-out procedure and the reversal of the moving direction of the camera so that a separate reversal is superfluous, and, on the other hand, having the backwind of the camera take place only during a predetermined interval, with the motor being subsequently shut off.

This object is accomplished by the provision of an automatic lap dissolve mechanism wherein the following features are combined:

Two electric contacts are conventionally provided which are actuated when the diaphragm leaves are moved into their closed position. The actuation of these contacts effects a reversal of the polarity of the motor. In the circuit of the camera motor, a switching element is arranged which interrupts the current flow to the camera motor at a defined instant after the polarity reversal of the motor. Timers are provided for defining this instant and these timers are actuated at the beginning of the camera backwind and operate the switching element after the predetermined period of time has elapsed.

Accordingly, the person using such an automatic lap dissolve system has only to press a button at the instant he deems suitable. This button will be called lap dissolve button in the following description. Thereby, the diaphragm setting motor or the measuring unit is connected directly with the current source, and the diaphram begins to close. The additional processes, namely switchover to backwind, backwinding of the faded-out film strip, and shutoff of the camera take place automatically.

Several designs are possible for such an automatic lap dissolve mechanism. These designs differ from one another, for example, by either effecting the reversal of the camera motor directly by means of the diaphragm leaves or by interposing a relay. Further, the timer used is either purely mechanical or of electronic design.

In this connection, it is preferred to construct the timer in such a manner that, when the lap dissolve button is operated, the timer is actuated as a chronometer and switches over from conducting a time measurement to generating a time signal when the motor is reversed to backwind. To accomplish this, means are provided which ensure that the time signal formed is equal to the previously measured interval of time.

BRIEF DESCRIPTION OF THE DRAWING

These features and additional aspects of the invention are seen from the drawing wherein the invention is illustrated in three different embodiments, to wit.

DESCRIPTION OF THE PREFERRED EMBODIMENTS

Figure 1:
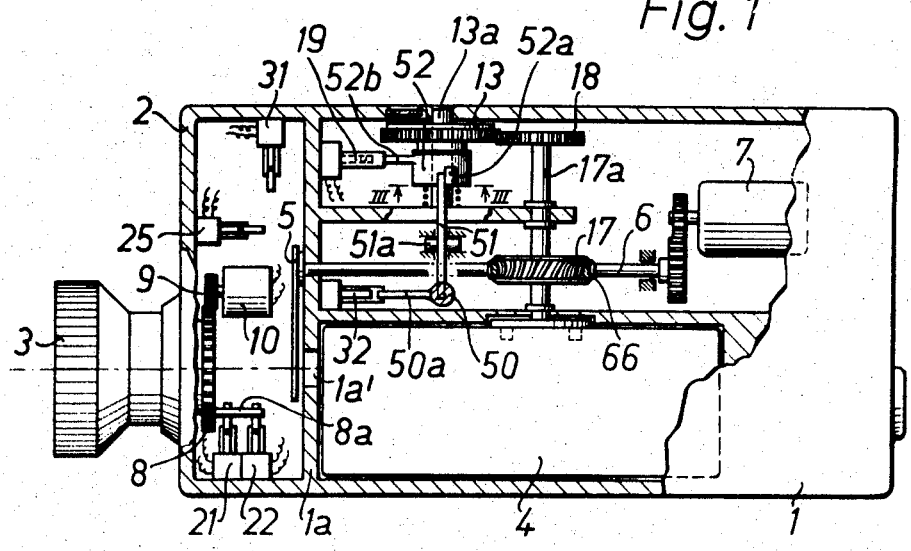
FIG. 1 is a schematic plan view of a motion picture camera partly in section.

With particular reference to FIG. 1, it is shown that the housing 1 of the motion picture camera carries an objective 3 at the front plate 2. A film cassette 4 is accommodated in the interior of the housing in front of a partition 1a having the image aperture 1a'. A sector shutter 5 rotates in front of the gate and this shutter is driven via a shaft 6 by a camera motor 7.

The objective 3 is equipped with an objective diaphragm, not shown, in the form of an iris diaphragm. The rotatable leaf ring of this iris diaphragm is extended in the direction of the housing and is fashioned into a ring gear 8 in the interior of the housing. By way of a pinion 9, the gear ring 8 and thus the diaphragm leaf ring are rotated by a diaphragm motor 10 and this motor is part of the exposure control circuit. The gear ring 8 is furthermore provided with a pin 8a rotating with the gear ring and cooperating with two electric double-throw switches 21, 22. The switches are thereby actuated in the closed position of the diaphragm.

Furthermore, a trip contact 25 is disposed in the housing 1 and upon the actuation of this contact, the circuit of the camera motor 7 is closed. Lap dissolve contact 32 is likewise arranged in the housing. By means of this contact the diaphragm motor 10 is directly connected with the battery, not shown. The lap dissolve contact 32 is closed by means of lap dissolve button 50. In FIG. 1 this button is illustrated as being located on a rather long rod extending vertically with respect to the plane of the drawing. The rod has an arm 50a which closes the lap dissolve contact 32 when the button 50 is depressed. Furthermore, the rod effects locking lever 51 rotatable about a stationary pin 51a, in that the free end of the locking lever pivots upwardly from the plane of the drawing of FIG. 1 when the button 50 is depressed.

Figure 5:
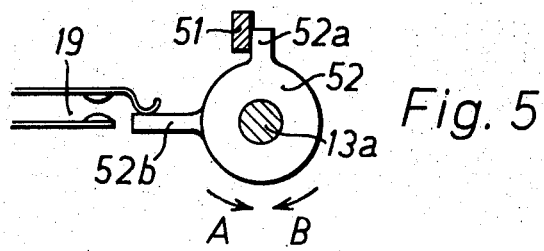
FIG. 5 shows a detail of a mechanically working timer.

As shown in FIGS. 1 and 5, the free end of the locking lever 51 cooperates with a control member comprising a sleeve 52 seated on the axle 13a carrying the single-frame counting disk 13. Disk 13 and axle 13a are fixedly connected with each other and are driven by the camera motor 7 via a gear wheel 18, a shaft 17a, as well as a worm gear 17 and a worm 66.

The sleeve 52 is frictionally coupled with the axle 13a and the disk 13, respectively, so that it rotates together with the two latter components, unless prevented from doing so. However, in the normal condition, the sleeve is prevented from this rotation by the locking lever 51 and this lever engages cam 52a and retains the sleeve even when the disk 13 and the axle 13a are rotating in the direction of arrow A in FIG. 5. This direction of rotation is the direction in which the individual-frame counting disk turns during the normal forward motion of the camera.

The sleeve 52 exhibits still another cam 52b which cooperates with circuit breaker 19. When the camera runs backward, the current flow to the camera motor proceeds via this circuit breaker, in a manner which is described below, and this circuit breaker is maintained constantly in an open position during normal operation of the camera by means of the cam 52b.

Figure 2:
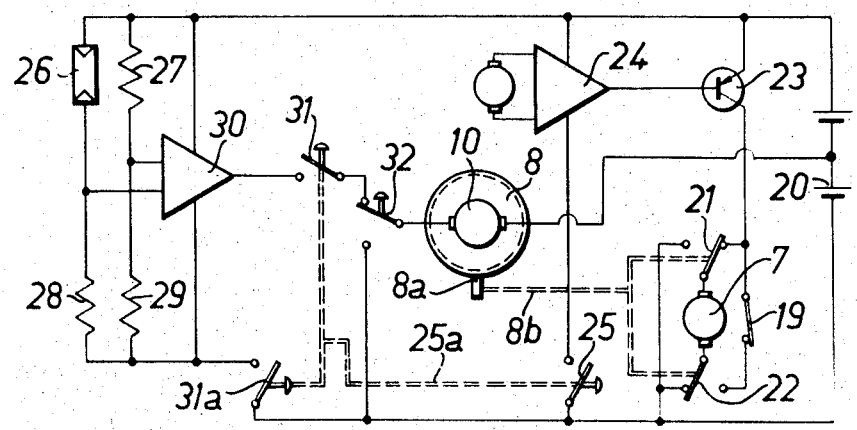
FIG. 2 is a detailed view of a lap dissolve circuit showing an embodiment wherein the diaphragm leaves reverse the camera motor directly, and a mechanically operating timer is provided.

FIG. 2 shows the circuit of the first embodiment of this invention in a simplified illustration. The camera motor 7 is connected to a current source 20 via double-throw switches 21, 22 and transistor 23. The latter is controlled by a variable-gain amplifier 24 serving for speed control and the trip contact 25 is likewise inserted in the line leading to this amplifier. This type of tripping and speed control is conventional and thus is not described in any greater detail. Additionally, the circuit exhibits an exposure control element in the form of a Wheatstone bridge consisting of the photoconductive resistor 26 and the fixed resistors 27, 28, 29. In the diagonal branch of the bridge, an amplifier 30 is connected, the output of which leads to the diaphragm motor 10 which, in turn, is connected to the ground with its other pole. Depending on the amperage in the diagonal branch and on the resultant polarity of the current at the output of the amplifier 30, the diaphragm motor rotates toward the right or the left, respectively, and adjusts the diaphragm.

Two contacts are contained in the connection between the amplifier 30 and the motor 10. First, there is a measuring contact 31 (coupled with a contact 31a) and, second, there is a lap dissolve contact 32. The measuring contacts 31, 31a are actuated in a conventional manner prior to tripping the camera, so that the diaphragm is already set to the present object brightness at the beginning of the scene and thus fade-in effects are avoided when filming a normal scene. In case the user of the camera forgets to actuate contacts 31, 31a beforehand, these contacts are furthermore connected together with the trip contact 25 in the manner of a sequence switch, illustrated by the dashed line 25.

By means of the lap dissolve contact 32, the diaphragm motor 10 can be disconnected from the exposure control element and connected with one of its poles directly with the current source in such a manner that the motor starts up in the closing direction of the diaphragm leaves and closes the diaphragm completely.

The diaphragm motor 10 drives, in the manner described above, the gear ring 8 which is fixedly connected with the rotatable leaf ring in the objective diaphragm. The pin 8a thereof is operatively connected with the double-throw switches 21, 22, and this positive connection is indicated in FIG. 2 by dashed line 8b.

The contact breaker point 19 is connected in the lead line to the camera motor 7, which lead line is effective during backwind. This circuit breaker 19 is opened by the mechanical timer 13 after a predetermined backwind period and thus separates the camera motor from the current source.

The above-described circuit of FIG. 2 functions, during a lap dissolve, in the following manner:

For the purpose of initiating lap dissolve, the user presses the lap dissolve contact 32. Thereby, the diaphragm motor 10 is connected directly to the battery 20 by its second pole, so that it rotates along the lines of closing the diaphragm. This is the fade-out step. During the initiation of this step, the locking lever 51 is also pivoted by pressing the lap dissolve button 50, so that the sleeve 52 is released for rotation with the single-frame counting disk 13 or the axle 13a. The axle rotates in the forward direction of arrow A during the fade-out process. Thereby, the cam 52b moves away from the contact 19, so that the contact is closed. In the position wherein the diaphragm is entirely closed, i.e. at the instant when the fade-out is terminated, the pin 8a meets the double-throw switches 21, 22 and actuates same. By the switch-over of these switches, the camera motor has its polarity reversed and now runs backwards, which, of course, results in the film being wound back.

At the same time, however, the single-frame counting disk 13 with its axle 13a likewise rotates backwards in the direction of arrow B and thus again entrains the sleeve 52 in the opposite direction. Consequently, the sleeve 52 traverses the same course it had followed previously and meets, at the end of this backward movement, the contact 19, opening the latter, whereby the camera motor is arrested, i.e. the camera is turned off. Now, the user of the camera can release the lap dissolve button, whereby, on the one hand, the contact 32 is opened again, so that the locking lever 51 is again engaged in its locking position behind the cam 52a and the sleeve 52 is again retained during a renewed forward operation.

In FIG. 5, the essential aspect of the present invention is seen especially clearly, wherein the forward motion of the sleeve after pressing the lap dissolve button is exactly equal to its backward run up to the opening of the contact 19. However, the forward run of the sleeve is equivalent to the fade-out period, i.e the gradual closing of the diaphragm up to the actuation of the double-throw switches 21, 22, whereas the backward motion of the sleeve is equivalent to the backwind of the film. Thus, by means of a mechanical device and in a simple manner, the fade-out period and the reverse transport of the film are always of an exactly equal length, no matter whether the fade-out is effected from shutter positions 2 or 16.

For the fade-in at the beginning of the new scene, the user of the camera, after first releasing the button of the lap dissolve contact 32 and thus again connecting the diaphragm motor with the exposure control element, must again depress the trip button at the trip contact 25. By actuating the trip button, the trip contact 25 and the measuring contacts 31, 31a are closed. Thereby, the diaphragm motor is turned on again, the pin 8a releasing the double-throw switches 21, 22, so that the motor 7 can again start up in forward direction. During the forward movement, the disk 13 also returns into its starting position.

Figure 3:
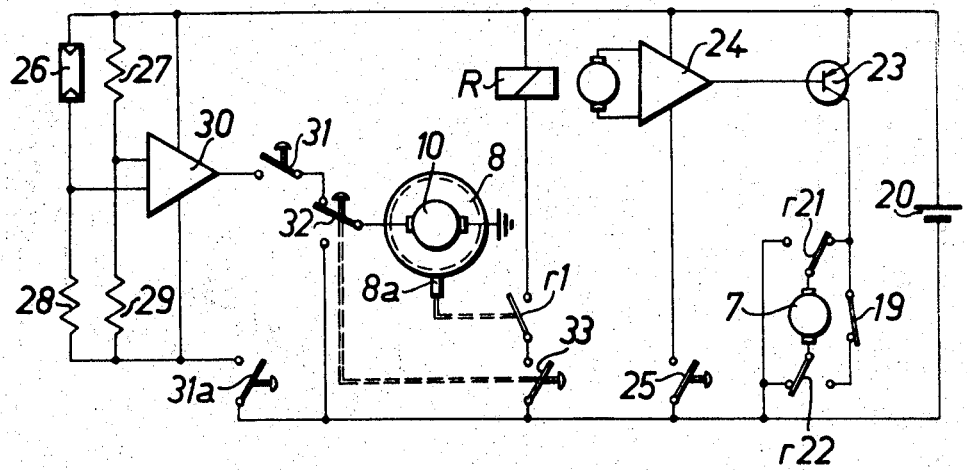
FIG. 3 is a detailed view of a lap dissolve circuit showing an embodiment according to FIG. 1, wherein the diaphragm leaves switch a relay which, in turn, reverses the camera motor.

The embodiment according to FIG. 3 functions in the same manner as does the embodiment of FIG. 2. However, in this case, the pin 8a does not operate the double-throw switches 21, 22 directly. Rather, these switches, denoted by r21, r22 in FIG. 3, are switches of a relay R additionally provided in this embodiment. The pin 8a, instead, switches the relay contact r1, so that the relay closes and, in turn, actuates the double-throw switches r21, r22. A contact 33 is additionally coupled with the button for the lap dissolve contact 32 in this embodiment, which contact 33 is connected in the line to the relay R. Upon closing of the lap dissolve contact 32, the contact 33 is likewise closed and the relay can close when the pin 8a closes the contact r1. In contrast thereto, upon releasing the lap dissolve button after the camera has been shut off, the contact 33 is opened together with the lap dissolve contact 32, so that the relay is deenergized and thus reverses the double-throw switches r21, r22 again to forward operation.

Figure 4:
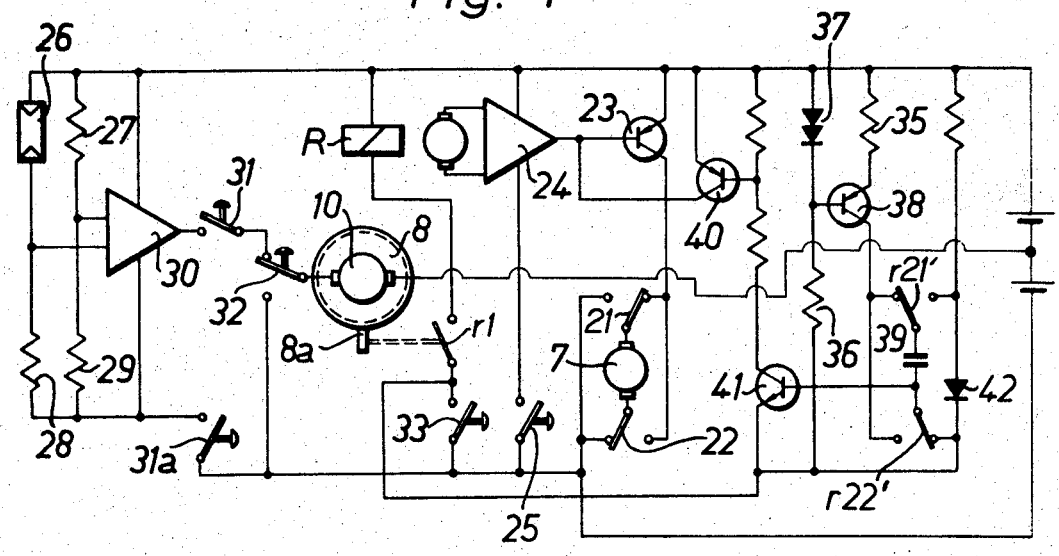
FIG. 4 is a detailed view of a lap dissolve circuit showing an embodiment wherein an electronically operating timer is provided.

In FIG. 4, an embodiment is shown wherein the fade-out period is measured electronically. In addition to the above-described structural components, including the relay R, the circuit of FIG. 4 contains an electronic timer in place of the mechanical timer. The electronic timer consists of a constant current source comprising the resistors 35, 36, the diode 37, and the transistor 38, and furthermore a capacitor 39, to the two poles of which respectively one double-throw switch r21' and r22' is connected. These double-throw switches are likewise contacts of the relay R, so that the reversal of polarity of the capacitor 39 coincides with the polarity reversal of the camera motor 7. The time-base circuit is supplied with current via the contact 33 which is also operated together with the lap dissolve contact 32 in this embodiment. Once the lap dissolve is initiated by closing the lap dissolve contact 32, the diaphragm begins to close. However, simultaneously, the time measuring circuit is actuated via the contact 33. The transistor 38 forms the above-mentioned source of constant current, together with the resistors 35, 36 and the diode 37, which current source now gradually charges the capacitor 39. Two additional transistors 40 and 41 connected in the circuit are blocked during this step. Once the diaphragm has reached its final position, it closes the relay contact r1 as described above. The relay energizes, and the contacts r21, r22 reverse the polarity of the motor 7. At the same time, however, the contacts r21', r22' reverse the polarity of the capacitor 39. At this point, the transistor 41 is no longer short-circuited at its base, but rather has the charging voltage of the capacitor 39 applied thereto as the blocking voltage. Thereafter, however, transistor 38 thus remains blocked, as well as the transistor 40. During the backwind of the camera, the above-mentioned constant current source discharges the capacitor 39. Once the capacitor is completely discharged and has its polarity reversed, the constant current flows into transistor 41. The latter becomes conductive, together with transistor 40, which latter blocks transistor 23. Accordingly, the camera is arrested. The diode 42 in the timer circuit has the task of compensating the base-emitter voltage of the transistor 41 so that the enire charge stored in the capacitor during the fade-out process is again withdrawn during the reverse motion. Due to the fact that the same constant current is employed for charging and discharging the capacitor, the backwind time of the camera is always with certainty exactly equal to the fade-out period. After opening the measuring contact 31, the trip contact 25, and the lap dissolve contact 32, the entire circuit is placed in its rest condition. The start-up is conducted as described above in connection with FIG. 2.

I claim:

1. In a motion picture camera having in combination a film drive, a diaphragm with leaves positioned to vary the opening for the light path of the camera, current source means within said camera, current controlled diaphragm control means coupled to said diaphragm, a reversible camera motor mechanically connected to said film drive and electrically connected to said source, and photo resistor means connected to the diaphragm control means for varying the magnitude of current in the diaphragm control means to vary the opening of the diaphragm in accordance with the intensity of light in the light path from the object to be photographed, the improvement comprising automatic lap dissolve mechanism having:

(a) a manually actuatable lap dissolve button (50) on the housing of said camera;
(b) dissolve switch means operably connected to said dissolve button and said diaphragm control means for causing said diaphragm to move to its closed position when said button is actuated;
(c) electric contact means actuated by said diaphragm control means when the diaphragm leaves move into their closed position for reversing the polarity of said camera motor;
(d) a shaft driven by said camera motor (7); and
(e) a timer having a control member (52), which is connected for common rotation with said axle, a locking lever (51) within said camera adjacent to said control member and operatively connected to said lap dissolve button (50), said control member being blocked during the forward run of said camera by said locking lever and said control member being released when said dissolve button is actuated, and a switch means (19) inserted in the orbital path of said control member, said switch means being maintained open while said control member is in blocking position and released for closing when said control member is moved from its blocking position, said switch means interrupting current flow to said camera motor at a period of time after the polarity reversal of said motor.

2. The automatic lap dissolve mechanism of claim 1, wherein said control member (52) is a sleeve resiliently seated on its associated axle and having projections serving as an abutment for said locking lever and as an operating cam for said electric switch.

References Cited

UNITED STATES PATENTS

| | | | |
|---|---|---|---|
| 3,246,944 | 4/1966 | Winkler | 352—91 |
| 2,117,694 | 5/1938 | Becker | 352—217 |
| 3,567,316 | 3/1971 | Wilharm | 352—91 |

SAMUEL S. MATTHEWS, Primary Examiner

R. E. ADAMS, Jr., Assistant Examiner